Jan. 18, 1938.　　　G. K. O'CONNOR　　　2,106,036
REGULATOR
Filed Oct. 4, 1934
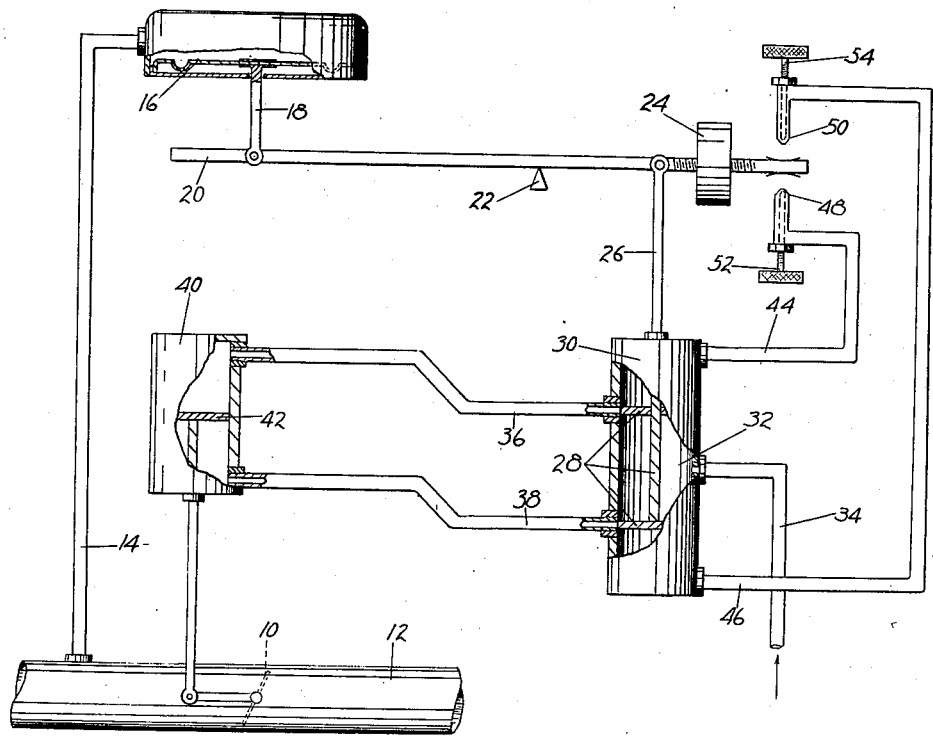
INVENTOR.
George K. O'Connor
Jn. W. McConkey
ATTORNEY.

Patented Jan. 18, 1938

2,106,036

UNITED STATES PATENT OFFICE 2,106,036

REGULATOR

George K. O'Connor, Winnetka, Ill., assignor to Smoot Engineering Corporation, Chicago, Ill., a corporation of Delaware Application October 4, 1934, Serial No. 746,840

4 Claims. (Cl. 121—38)

This invention relates to regulators, and is illustrated as embodied in several forms of pressure regulators arranged with a pilot valve or the like controlling a relay cylinder which operates by power. An object of the invention is to provide stabilizing means preventing over-controlling and hunting and which operates as a function of the operation of the relay cylinder.

It has previously been proposed to use a fluid stabilizer for a regulator of this general type, operated by and as a function of the pressure of the fluid in the power mechanism. The present invention has, in one phase, to do with improving the operation of such a stabilizer by making it act as a function of the throw or actual movement of the power piston in the relay cylinder, i. e. as a function of the displacement and not of the pressure of the fluid. Thus the stabilizer acts directly in accordance with the effect produced, rather than in accordance with the force tending to produce that effect.

An example of the advantages of this type of operation is in the fact that if the relay piston should stick the stabilizer will offer no resistance to the action of the weigh beam or its equivalent.

The above and other objects and features of the invention, including various novel combinations of parts and desirable particular constructions and arrangements, will be apparent from the following description of the illustrative embodiments shown in the accompanying drawing, in which:

The single figure is a diagram of a regulator embodying the invention.

The regulator is shown connected to operate a valve 10 in a fluid conduit 12 to maintain an even pressure beyond (i. e. to the left of) the valve, the flow being from right to left. As is well known, these regulators are used for many other purposes, and the use shown is intended to be illustrative only. When so used, the conduit 12 beyond the valve 10 is connected by a connecting conduit 14 to the interior of a pressure-operated device shown as having a pressure-operated diaphragm 16.

The diaphragm 16 is connected, by means such as a link 18, to a weigh beam or the equivalent 20. The beam 20 illustrated is pivoted on a fulcrum 22, and has an adjustable loading illustrated as a movable weight 24.

The weigh beam 20 is connected by a connecting rod 26 or the like to a pilot valve. This valve may be of any desired type, and is shown as including a valve piston 28 having spaced heads slidably seated in a valve cylinder or casing 30, and between which heads is an annular space 32.

The valve casing 30 communicates at its center (i. e. opposite the space 32) with an intake conduit 34 leading from a source of power fluid, such as an oil pump of any usual and desired form. Opposite the normal or balanced positions of the two heads of the valve piston 28, the casing communicates with two conduit connections 36 and 38 opening into opposite ends of a relay cylinder 40, diagrammatically shown as having a piston 42 operatively connected to the control valve 10.

A system as so far described will operate to control the position of the valve 10 and thus to regulate the pressure in the conduit 12. Thus, assuming that the pressure in conduit 12 drops, the pressure on the diaphragm 16 will be reduced and the weigh beam 20 will move clockwise about the fulcrum 22 under the influence of the weight 24. This will move the valve 28 downwardly, opening communication between supply pipe 34 and the pipe 38 leading to the lower side of the piston 42, such pressure raising the piston 42 to open the valve 10 wider and increase the pressure in the conduit 12 past the valve 10.

Since there must always be some time lag between changes of pressure in the conduit 12 and establishing of a corresponding pressure above the diaphragm 16, the pressure in pipe 12 will be above that for which the regulator is set before the diaphragm 16 acts to restore the weigh beam 20. When this increased pressure reaches the diaphragm 16, it will swing the weigh beam counterclockwise to raise the valve 28 and admit fluid above the piston 42 to close valve 10. As the pressure in the conduit 12 drops it will drop below the value for which the regulator is set due to the time lag and a continuous oscillation or hunting of the regulator will result.

The present invention has to do with stabilizing the operation of a regulator of this or an equivalent type, to prevent it from over-controlling and hunting.

In the arrangement illustrated, the upper and lower ends of the valve casing 30 are connected by conduits 44 and 46 to jets 48 and 50 impinging respectively on the lower and upper faces of the weigh beam 20 adjacent its end. The effective sizes of the jets may be adjusted by means such as needle valves 52 and 54.

In the operation of this embodiment, suppose there is a drop in the pressure in conduit 12 beyond the valve 10, allowing weight 24 to swing the weigh beam 20 in a clockwise direction. This pushes the valve piston 28 down, opening communication between the power source connection 34 and the conduit 38 leading to the lower end of cylinder 40, and between the conduit 36 from the upper end of the cylinder 40 and the conduit 44 leading to jet 48.

This tends to open valve 10, thereby increasing the pressure to the desired standard. To avoid doing this too rapidly, and giving a gradual operation which promotes accuracy and avoids any inertia and other effects which might lead to over-controlling, it will be seen that jet 48 resists the clockwise motion of the weigh-beam, in a degree which is a function of the displacement of oil or other fluid from the upper end of cylinder 40, the function taking account both of the volume of fluid displaced and its velocity of displacement. It will be seen that the action of the jet 48 tends to balance the weight 24 to turn the weigh-beam back to its normal balanced position prior to the time that the pressure on diaphragm 16 has reached the value for which the regulator is set. This tends to close the valve 28 and stop movement of the piston 42. However, as the piston 42 slows up or stops, discharge of fluid from the jet 48 slows up or stops so that its force is reduced or eliminated. Due to this action the valve 10 is permitted to have a fast first increment of movement which gradually slows up until it stops in the correct position to maintain the desired pressure in the conduit 12 without any overshooting or hunting.

In case of an undue increase in pressure in conduit 12, the reverse of the above-described cycle takes place, and counterclockwise movement of the weigh-beam is yieldingly resisted by the jet 50.

While one illustrative embodiment has been described in detail, it is not my intention to limit the scope of the invention to that particular embodiment, or otherwise than by the terms of the appended claims.

I claim:

1. A regulator comprising a weigh beam variably controlled in accordance with a condition to be controlled, a relay cylinder containing a double-acting piston, a control device for controlling said condition connected to said relay piston, fluid connections to opposite ends of said cylinder having a valve actuated by movements of said weigh beam, and fluid stabilizing means acting on said weigh beam and including oppositely-acting jets directed thereagainst and supplied with fluid from said cylinder and its connections.

2. A regulator comprising means variably controlled in accordance with a condition to be controlled, a relay cylinder containing a double-acting piston, a control device for controlling said condition connected to said relay piston, fluid connections to opposite ends of said cylinder having a valve actuated by movements of said means, and fluid stabilizing means acting on said means and including oppositely-acting jets directed there-against and supplied with fluid from said cylinder and its connections.

3. A regulator comprising a weigh beam variably controlled in accordance with a condition to be controlled, a relay cylinder containing a double-acting piston, a control device for controlling said condition connected to said relay piston, fluid connections to opposite ends of said cylinder having a valve actuated by movements of said weigh beam, and fluid stabilizing means acting on said weigh beam and including oppositely-acting jets directed there-against and supplied with fluid from said cylinder and its connections, together with means for adjusting the effective openings in said jets.

4. A regulator comprising means variably controlled in accordance with a condition to be controlled, a relay cylinder containing a double-acting piston, a control device for controlling said condition connected to said relay piston, fluid connections to opposite ends of said cylinder having a valve actuated by movements of said means, and fluid stabilizing means acting on said means and including oppositely-acting jets directed there-against and supplied with fluid from said cylinder and its connections, together with means for adjusting the effective openings in said jets.

GEORGE K. O'CONNOR.